Jan. 26, 1932.　　　G. J. THOMAS　　　1,842,885
BRAKE
Filed March 16, 1928　　2 Sheets-Sheet 1

INVENTOR
George J. Thomas
BY
M. W. McConkey
ATTORNEY

Jan. 26, 1932.  G. J. THOMAS  1,842,885
BRAKE
Filed March 16, 1928  2 Sheets-Sheet 2
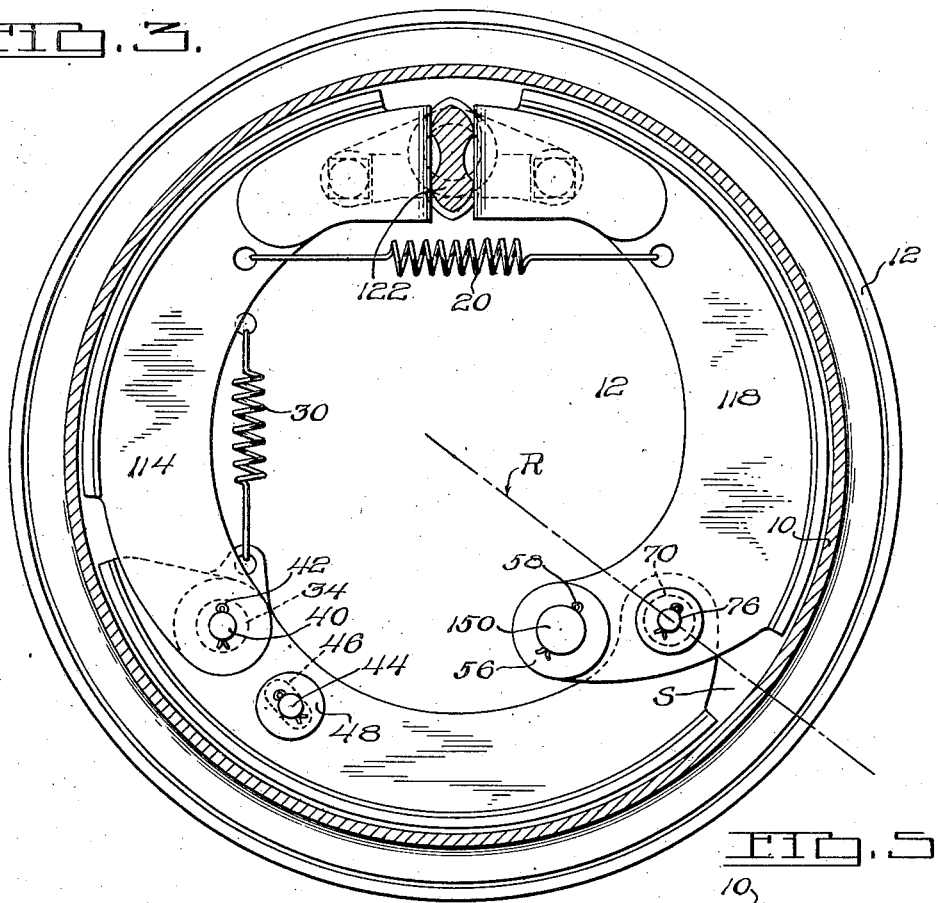
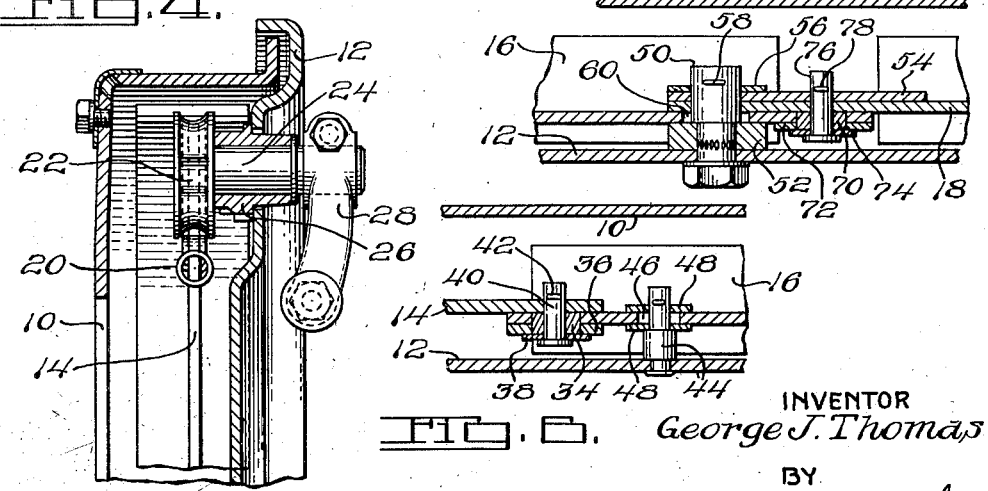
INVENTOR
George J. Thomas
BY
M. W. McConkey
ATTORNEY Patented Jan. 26, 1932

1,842,885

UNITED STATES PATENT OFFICE

GEORGE J. THOMAS, OF SOUTH BEND, INDIANA, ASSIGNOR TO BENDIX BRAKE COMPANY, OF SOUTH BEND, INDIANA, A CORPORATION OF ILLINOIS

BRAKE

Application filed March 16, 1928. Serial No. 262,109.

This invention relates to brakes, and is illustrated as embodied in an internal expanding automobile brake. An object of the invention is to provide uniform clearance at the heel ends of the friction surfaces of two shoes, or equivalent friction devices, one of which is anchored and the other of which is pivoted to the anchored shoe adjacent its anchored end. This is accomplished by arranging the pivot at such a point that the heels of the shoes move at substantially the same rate; ordinarily this point is on a radius of the drum which bisects the space between the ends of the friction surfaces of the two shoes.

Other features of novelty relate to an improved cam arrangement, and to other novel combinations of parts and desirable particular constructions which will be apparent from the following description of two illustrative embodiments shown in the accompanying drawings, in which:

Figure 3 is a view corresponding to Figure 2, but showing a modification;

Figure 4 is a partial vertical section on the line 4—4 of Figure 2.

Figure 5 is a partial section through the brake anchorage, on the line 5—5 of Figure 2; and Figure 6 is a partial section through the floating joint connecting two of the shoes, on the line 6—6 of Figure 2.

The illustrated brake includes a rotatable drum 10, at the open side of which is a backing plate 12 or the like, and within which is arranged friction means such as three brake shoes 14, 16, and 18, each of which is T-shaped in section, having an outer cylindrical friction face provided with brake lining, and having a generally-central stiffening web.

Figure 1:
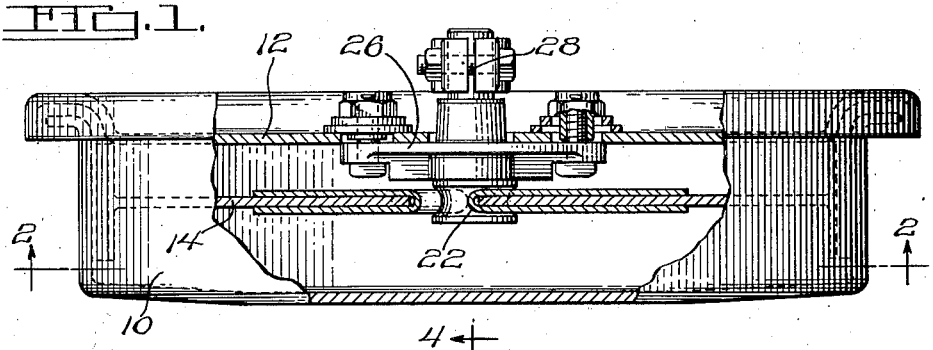
Figure 1 is a top plan view of the brake, partly broken away to show the novel engagement of the cam with the shoes.
Figure 2:
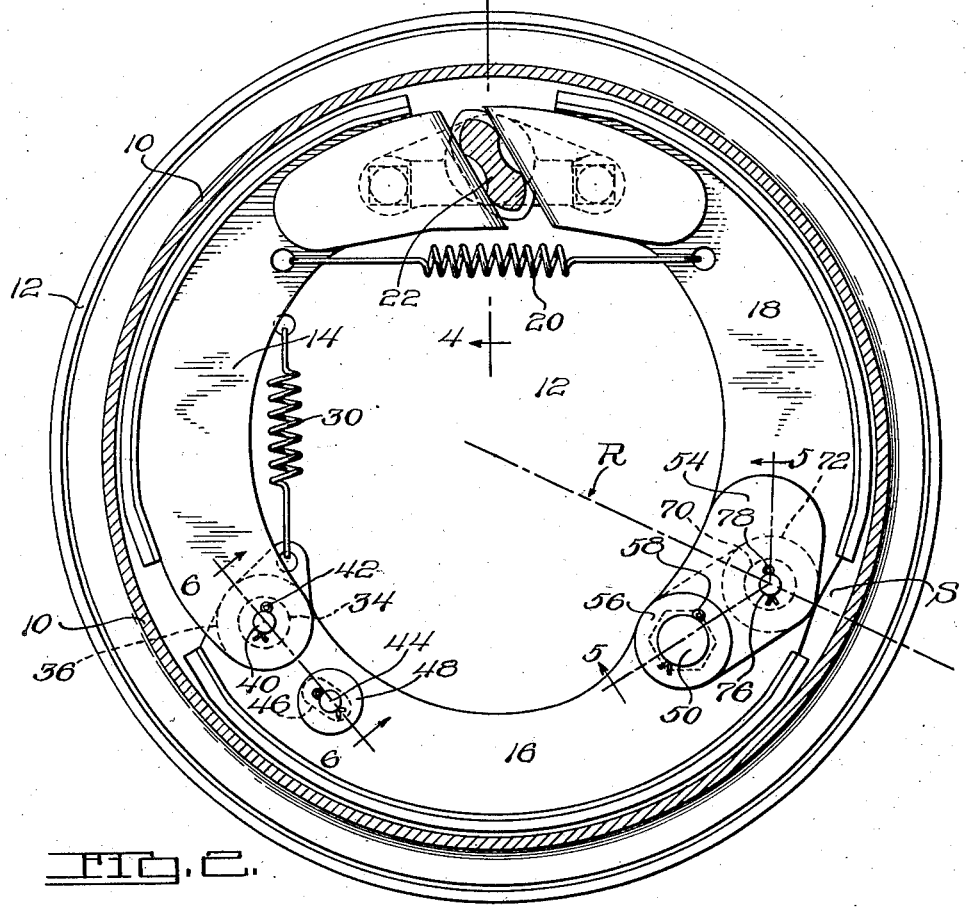
Figure 2 is a vertical section through the brake, just inside the head of the brake drum on the line 2—2 of Figure 1, showing the brake shoes in side elevation.

In the arrangement of Figures 1 and 2, the brake is applied, against the resistance of a return spring 20 tensioned between shoes 14 and 18, by means such as an inclined double cam 22 on a shaft 24 having a bearing in a bracket 26, and operated by a lever 28. When shoe 14 is so applied, it turns with the drum to apply shoe 16 against the resistance of an auxiliary return spring 30.

According to one feature of the invention, the efficiency of cam 22 is increased by providing shoes 14 and 18 with parallel cam-engaging surfaces inclined at an acute angle to a drum radius passing between the ends of the shoes, as shown in Figure 2.

Shoes 14 and 16 are pivotally connected, shoe 14 having a cylindrical pivot part 34 butt-welded to its side and on which shoe 16 is sleeved. A washer 36 may be projection-welded to the side of shoe 16 to increase its bearing on pivot 34. The shoe 16 is held on pivot 34 by means such as a washer 38 held by a pin 40 passing through shoe 14 and held by a cotter pin 42. A steady rest 44 passing through a slot 46 and having shoe-embracing washers 48 may be provided for shoe 16

Shoe 18 is pivoted on a fixed anchor 50 carried by the backing plate, reinforced if desired by a spacer 52, the shoe preferably having a separately-formed plate 54 projection-welded to its side to increase the bearing on the anchor as well as to strengthen the web of the shoe. A washer 56 held by a cotter pin 58 serves to hold the shoe 18 on the anchor. Shoe 16 has a relatively large opening 60 for the anchor so that the anchor does not interfere with the movement of this shoe.

According to an important feature of the invention, the torque of shoes 14 and 16 is taken by a pivot connecting the end of shoe 16 to the shoe 18 near the anchored end of shoe 18, the pivot being arranged substantially on a drum radius "R" bisecting the space "S" between the adjacent ends of the friction faces of shoes 16 and 18. By so arranging the pivot, the "heels", or ends of the friction faces, of these two shoes move toward the drum at the same rate in applying the brake, and the shoes may therefore be given the same clearance in released position, thus much facilitating the adjustment of the brake. The arrangement differs in thus arranging the pivot from the arrangements of my prior applications for Patent Nos. 747,669 and 743,877.

The particular pivot illustrated includes a cylindrical pivot 70 butt-welded to the side of shoe 18, and on which is sleeved on opening formed in the web of shoe 16. A washer 72 may be projection-welded to the side of shoe 16 to increase the width of the bearing on pivot 70. The shoe 16 is held on the pivot by a loose washer 74 held by a pin 76 passing through shoe 18 and held by a cotter pin 78.

The arrangement of Figure 3 differs from that described above, in the use of a vertical cam 122, and in having the anchor 150 well within the curve of shoe 116. This increases the effectiveness of shoe 118 and avoids the necessity of forming an opening in shoe 116 for the anchor, but has the disadvantage that the torque of shoe 116 has a component tending to swing shoe 118 away from the drum.

While two illustrative embodiments have been described in detail, it is not my intention to limit the scope of the invention to those particular embodiments, or otherwise than by the terms of the appended claims.

I claim:

1. A brake comprising, in combination, a drum, an anchor, a shoe within the drum pivoted on the anchor at one end, and another shoe having one end pivoted to the first shoe near its anchored end at such a point that movement of the two shoes in applying the brake causes movement of the heels of the two shoes toward the drum at the same rate.

2. A brake comprising, in combination, a drum, a pair of shoes arranged end to end within the drum and having friction surfaces arranged for engagement with the same zone of the drum, an anchor on which one of the shoes is mounted at its end, and a pivot connecting the end of the other shoe to the anchored shoe, the pivot being arranged substantially on a radius of the drum bisecting the space between the adjacent ends of said friction surfaces.

3. A brake comprising, in combination, a drum, an anchor, a shoe within the drum pivoted on the anchor at one end and another shoe slotted to receive said anchor and having one end pivoted to the first shoe near its anchored end at such a point that movement of the two shoes applying the brake causes movement of the heels of the two shoes toward the brake at the same rate.

4. A brake comprising, in combination, a drum, an anchor, a shoe within the drum pivoted on the anchor at one end and another shoe having one end pivoted to the first shoe near its anchored end at such a point that movement of the two shoes in applying the brake causes movement of the heels of the two shoes toward the drum at the same rate, the aforementioned anchor lying well within the curve of the second-mentioned shoe.

5. A brake comprising, a drum, an anchor, a primary shoe, a secondary shoe pivoted thereto, an auxiliary shoe pivoted to the anchor, and said secondary shoe pivoted to the auxiliary shoe on a drum radius bisecting the space between the adjacent ends of the secondary and auxiliary shoes.

6. A brake comprising, a drum, a primary shoe, an anchor, a secondary shoe, an auxiliary shoe pivoted to the anchor, said secondary shoe having a pivotal connection to the auxiliary shoe, said pivotal connection being located near the anchor of the auxiliary shoe and arranged to cause the same rate of movement of the heels of the auxiliary and secondary shoes toward the drum.

In testimony whereof, I have hereunto signed my name.

GEORGE J. THOMAS.